United States Patent [19]

Duyvesteyn

[11] Patent Number: 4,605,435

[45] Date of Patent: Aug. 12, 1986

[54] RECYCLING OF STEEL PLANT DUSTS TO STEEL FURNACES

[75] Inventor: Willem P. C. Duyvesteyn, Benthuisen, Netherlands

[73] Assignee: Amax Inc., Greenwich, Conn.

[21] Appl. No.: 696,981

[22] Filed: Jan. 31, 1985

[51] Int. Cl.$^4$ ............................................. C22B 7/02
[52] U.S. Cl. ........................................ 75/0.5 R; 75/3; 75/25; 75/110; 75/120
[58] Field of Search ............... 75/25, 3, 0.5 R, 110, 75/120

[56] References Cited

U.S. PATENT DOCUMENTS 4,119,455 10/1978 Cass et al. ............................... 75/25

FOREIGN PATENT DOCUMENTS 164011 12/1980 Japan ....................................... 75/25

Primary Examiner—Melvyn J. Andrews
Attorney, Agent, or Firm—Michael A. Ciomek; Eugene J. Kalil

[57] ABSTRACT

A method is provided for converting iron-containing steel plant dust to recyclable agglomerates. The method comprises mixing the dust with sufficient water and about 1 percent by weight Portland cement to permit pelletization. The pellets are dried at temperatures under 100° C. to result in strong easy-to-handle agglomerates. In a preferred embodiment of the process, the dust is treated by hydrometallurgical processes to recover cadmium, lead, and zinc prior to agglomeration. The resulting pellets can then be recycled to the steel furnace or stored as a nontoxic waste.

3 Claims, No Drawings

RECYCLING OF STEEL PLANT DUSTS TO STEEL FURNACES

This invention relates to the recycling of steel plant dusts to steel furnaces and, in particular, to a method for converting fine iron-containing steel plant dusts to recyclable agglomerates.

BACKGROUND OF THE INVENTION

During melting and refining of steel, the gas leaving the furnace carries a substantial amount of fine dust particles. To protect the atmosphere, these particles are removed in cyclones, scrubbers, and other similar devices. The dust particles are made up of two types of materials. Firstly, it consists of fine particles charged to the furnace such as those of iron oxides, calcium oxide, and silica, which are mechanically carried away by the gas. Secondly, it consists of oxide particles of nonferrous metals such as zinc and lead, which evaporate at the high temperatures of the steel bath and later condense and oxidize in the flue. The amounts of these nonferrous metal oxides in the dust increase as the dust is repeatedly recycled or as more scrap containing these metals are charged into the furnace.

The dust can be repeatedly recycled only for a limited number of cycles. With each recycle, the amount of dust to be collected increases due to larger proportion of the very fine dust particles in the feed. The feeding of such fine particles of low bulk density becomes increasingly difficult. Furthermore, as the amount of recycled dust increases, the energy requirement for reducing and melting iron and other metals from the dust increases.

Also, with repeated recycling, the nonferrous metal content of the dust increases to the point where their return to the steel bath adversely affects the steel melting operation. As oxides present in the slag, they attack the refractory lining of the furnace. In reduced form, these metals enter the molten steel at concentrations higher than permissible to meet specifications for proper mechanical and physical properties of the steel. At this point, the dust has to be removed from the system. Traditionally, this dust has been considered a waste material and disposed of in landfills.

This disposal method is becoming more expensive because of increasing land and transportation costs and because of increasingly stringent environmental protection regulations. Since the dust particles are very fine, they are likely to become airborne unless they are agglomerated to some extent or kept covered. Furthermore, the chemical nature of these dust particles is such that they classify as hazardous waste, based on the EP toxicity test prescribed by the United States Environmental Protection Agency. As disclosed in "Characterization of Steelmaking Dusts from Electric Furnace", *United States Bureau of Mines Report of Investigation No. 8750* (1983) by S. L. Law et al., the toxicity is related to the presence of lead, cadmium, and sometimes chromium.

It would, therefore, be desirable to provide a method that would remove nonferrous metals like zinc, lead, and cadmium from the dusts and convert the remaining iron-bearing residue into a physical form suitable for easy recycling to the steel furnaces or for storage.

STATE-OF-THE-ART AND SHORTCOMINGS OF THE EXISTING PROCESSES

Because of increasing awareness for environmental concerns in the 1960's, attempts have been made to develop processes for recovery of zinc and lead from the steel plant dusts. At that time, pyrometallurgical processes were popular in primary zinc and lead industries, and therefore, it is not surprising that similar processes were proposed to treat the steel plant dust. Basically, the processes were variations of the commercial Waelz Process. In essence, the dust is partly reduced at high temperatures to volatilize zinc and lead metals, which are then oxidized and condensed as mixed oxides. A variety of equipment have been suggested to perform the actual operations of reduction, oxidation, and condensation, as set forth in numerous U.S. patents listed below.

| U.S. Pat. No. | Date | Inventor(s) |
| --- | --- | --- |
| 3,262,771 | 7/1966 | Ban |
| 3,403,018 | 9/1968 | Thom |
| 3,754,890 | 8/1973 | Fitch |
| 3,756,804 | 9/1973 | Stevenson |
| 3,770,416 | 11/1973 | Goksel |
| 3,850,613 | 11/1974 | Allen |
| 4,396,423 | 8/1983 | Stephens, et al. |
| 4,396,424 | 8/1983 | Yatsunami, et al. |

None of these processes have been implemented on a commercial scale. This is chiefly because of high capital and operating costs involved with high temperature ($\sim 1,200°$ C.) operations which require expensive energy but also elaborate gas handling and cleaning systems to reduce the atmospheric pollution. The presence of chloride and fluoride salts in the dust poses a severe corrosion problem. Another major shortcoming of the pyrometallurgical processes is that both lead and zinc are collected together in one intermediate product that needs considerable further processing to separate the two metals.

As an alternative, hydrometallurgical processes have been investigated, particularly after the escalating energy costs experienced in the early 1970's. It is also worth noting that about 90 percent of the primary zinc is now produced by a hydrometallurgical process.

One hydrometallurgical method, disclosed in U.S. Pat. No. 3,849,121 granted to Burrows, recommends use of ammonium chloride as a lixiviant. Another process, disclosed in U.S. Pat. No., 4,071,357 granted to Peters, recommends use of ammonia and carbon dioxide gases. Use of strong caustic as a lixiviant is suggested in European patent No. 0040659 granted to Pooley et al. These alkaline leaching processes suffer from three common shortcomings: (1) The solutions generated are not compatible with existing zinc plant operations which all treat zinc sulfate solutions, (2) lead is also dissolved in these processes along with the zinc, and (3) the reagents are expensive.

Acid leaching of the steel plant dust would overcome some of these shortcomings. An article by D. Pearson entitled "Recovery of Zinc from Metallurgical Dusts and Fumes", Chapter 14, of the publication *Process and Fundamental Considerations of Selected Hydrometallurgical Systems*, M. C. Kuhn, Editor, Society of Mining Engineers of AIME (1981, pp. 43-53) describes the work performed at Warren Springs Laboratory in which sulfuric acid was used to dissolve the zinc from electric arc furnace dusts. While zinc recovery of about 80 percent was obtained, iron dissolution was extensive, about 20 to 22 g/L, indicating high acid consumptions. An even more serious problem was the separation of residual solids from the solution.

Recently, several hydrometallurgical processes have been developed which overcome these problems and permit recovery of cadmium, lead, and zinc as set forth in co-pending patent applications Ser. Nos. 696,977, 696,978, 696,979, and 696,980, all filed Jan. 31, 1985 the disclosures of which are incorporated by reference.

The residue from these processes is rich in iron oxide and can form a valuable feed to the steel furnaces, if it can be recycled in a suitable form. We have found that agglomeration with a very small amount of commonly used Portland cement converts the steel plant dust or their leach residues to strong, easy-to-handle pellets, and this is the subject of this present invention.

OBJECTS OF THE INVENTION

It is an object of this invention to provide a method for converting iron-containing steel plant dusts to recyclable agglomerates.

Another object is to provide, as an article of manufacture, agglomerated steel plant dusts capable of easy mechanical handling for recycling to steel plant furnaces or storing as a nontoxic waste.

These and other objects will more clearly appear when taken in conjunction with the following disclosure and the appended claims.

SUMMARY OF THE INVENTION

The steel plant dust, either as is or after hydrometallurgical treatments to recover cadmium, lead, and zinc values, is mixed with water (if needed) and Portland cement and agglomerated into pellets. Generally, no water addition is required when the dust has been treated by hydrometallurgical processes. When working with dry dust or leach residues, the amount of water required generally ranges up to about 15 percent, the amount being sufficient to enable the dust to stick together when pelletized, for example, about 10 to 15 weight percent. The amount of cement to be added is very small, generally about 0.5 to 2 percent. Drying of these pellets at relatively low temperatures (below 100° C.) imparts to them good mechanical strength against attritioning. This characteristic permits easy handling during recycling of the pellets to steel furnaces or for storage.

DETAILS OF THE INVENTION

The process of this invention can be applied to steel plant dusts of various compositions and particle size range. The dust used in the present process development program was typical of the electric arc furnace dust generated at the midwest steel plants utilizing significant amounts of scrap. It analyzed 29.8 percent iron, 24.8 percent zinc, 2.83 percent lead, and 6.23 percent calcium. Most of the particles were below 100 mesh. As illustrated by Example 1, agglomeration with as little as 0.5 percent (by weight) cement considerably improved the attrition resistance of the pellets.

On a commercial scale, the pelletizing may be carried out in the known manner in a slightly inclined rotary cylinder, wherein a damp mixture is formed into spherical, spheroidal, or rounded pellets, the mixture being fed into the upper end of the rotary cylinder and the pellets discharged from the lower end. The pellets may range in size up to 6 inches and generally from about ½ to 2 inches.

While agglomeration with cement increased the chemical inertness of the pellets, this particular steel plant dust was so high in cadmium and lead contents that the resulting pellets could not be classified as nontoxic waste for storage purposes. Their recycling to the steel furnace, while physically very easy to accomplish, may lead to chemical problems due to very high zinc and lead contents of the pellets. The dust may contain about 20 to 60 percent iron, about 5 to 40 percent zinc, about 0.5 to 6 percent lead by weight and the balance oxides of other metals, e.g., Cd, Ca, Mn, Si, Mg, Al, Cu, Ba, Cr and Ni, etc., as residual metal oxides.

However, when the dust was processed hydrometallurgically to recover zinc and lead values and the remaining iron-rich residue then agglomerated with 0.5 percent cement, as set forth in Example 2 hereinafter, excellent results were obtained both in terms of mechanical strength of the pellets and their chemical inertness in standard EP toxicity tests prescribed by the United States Environmental Protection Agency. The hydrometallurgical processes consisted of sulfate/chloride leaching for dissolution of cadmium and zinc. The residue was next leached with caustic or brine to dissolve lead. These hydrometallurgical processes are described in detail in the aforementioned co-pending patent applications. A more thorough washing of the leach residues, prior to agglomeration, would be preferred if the pellets are to be stored as nontoxic waste instead of being recycled to the steel furnaces as a source of iron. The steel dust following hydrometallurgical treatment contains at least about 40 percent iron as do the agglomerates.

EXAMPLE 1

Two parallel tests were run with an electric arc furnace steel plant dust containing 29.8 percent iron, 24.8 percent zinc, 2.83 percent lead, and 6.23 percent calcium. In both tests, enough water (about 10 to 15 percent by weight) was added to prepare the consistency of a stiff dough. In the first test, no cement was added. In the second test, cement was added in an amount equivalent to 0.5 percent by weight.

The pellets, formed by hand rolling, were allowed to dry overnight at room temperature and then at 90° C. for 4 hours. The dry pellets were then put in plastic bottles and tumbled on a roller for 30 minutes. Next, the contents of the bottle were dry screened to remove powder (formed because of attritioning) from the residual pellets. The weight of powder was determined and used to calculate, as a percentage, the extent of attritioning. The results are presented below in Table 1. The pellets were then further ground and subjected to standard EP toxicity test prescribed by the United States Environmental Protection Agency. The EP test leachate solutions were analyzed for cadmium, chromium, and lead. These results are also included in Table 1.

TABLE 1

| Agglomeration of Steel Plant Dust | | |
|---|---|---|
| | Test No. 1 | Test No. 2 |
| Cement Addition, % | 0 | 0.5 |
| Attritioning, % | 31.8 | 15.9 |
| EP Leachate, Analysis, ppm | | |
| Cadmium | 11 | 10 |
| Chromium | 0.091 | 0.025 |

TABLE 1-continued

| Agglomeration of Steel Plant Dust | | |
|---|---|---|
| | Test No. 1 | Test No. 2 |
| Lead | 153 | 147 |

The results shown in Table 1 indicate that cement addition, even at a very small dosage, significantly improved the mechanical strength (resistance to attritioning) of the pellets. The cement addition also resulted in lower concentrations of cadmium, chromium, and lead in the EP test leachate, although the levels are still higher than permissible by the Environmental Protection Agency for nontoxic classification (1 ppm cadmium and 5 ppm lead). The pellets are generally dried at an elevated temperature below 100° C. to assure the hardening thereof.

EXAMPLE 2

Tests similar to those described in Example 1 were performed on the dust after it had been treated by hydrometallurgical processes to remove zinc and lead. A mixed sulfate/chloride leaching was used to remove zinc and cadmium. The residue was then leached with caustic or brine to dissolve lead. The final residue cakes were blended and mixed with 0.5 percent cement. Pellets were then formed, dried, and tested as described in Example 1. The results are given in Table 2 below.

TABLE 2

| Agglomeration of Hydrometallurgically Processed Steel Plant Dust | | |
|---|---|---|
| | Test No. 3 | Test No. 4 |
| Cement Addition, % | 0.5 | 0.5 |
| Attritioning, % | 2.7 | 2.7 |
| EP Leachate, Analysis, ppm | | |
| Cadmium | 0.23 | 0.53 |
| Chromium | 0.004 | 0.018 |
| Lead | 6.78 | 4.72 |

The results presented in Table 2 (when compared with those presented in Table 1) clearly show that agglomeration of leach residues resulted in even better mechanical strength and chemical inertness. The lead content of the EP leachate would have been even lower if the leach residues had been washed more thoroughly prior to agglomeration. The pellets can thus be stored as nontoxic waste, if required.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for converting iron-containing steel plant dust into recyclable agglomerates, said steel plant dust containing by weight about 20 to 60 percent iron, about 5 to 40 percent zinc, about 0.5 to 6 percent lead and the balance essentially residual metal oxides, including cadmium oxide, and oxides of CA, Mn, Si, Mg, Al, Cu, Ba, Cr and Ni which comprises, hydrometallurgically treating said dust to remove substantially said zinc, lead and cadmium, mixing said hydrometallurgically treated steel plant dust with about 0.5 to 2 percent by weight of Portland cement and water sufficient for the dust to stick together as pellets, pelletizing said mixture to form rounded agglomerates having an average size ranging from about ½ to 2 inches, and air-drying said agglomerates to increase the strength thereof for mechanical handling.

2. The method of claim 1, wherein the amount of water added ranges up to about 15 percent by weight.

3. The method of claim 2, wherein the amount of water ranges from about 10 to 15 percent by weight.

* * * * *